United States Patent [19]
Crutchley et al.

[11] 3,758,094
[45] Sept. 11, 1973

[54] FRICTION CLUTCHES AND TO ENGAGING LOAD APPLYING SPRING MEANS FOR SUCH FRICTION CLUTCHES

[75] Inventors: Frederick Crutchley; David Hindley, both of Leamington Spa, Warwickshire, England

[73] Assignee: Automotive Products Company Limited, Leamington Spa, Warwickshire, England

[22] Filed: Nov. 24, 1970

[21] Appl. No.: 92,336

[30] Foreign Application Priority Data
Dec. 3, 1969  Great Britain................... 59,076/69
May 19, 1970  Great Britain................... 24,272/70

[52] U.S. Cl. ............................................. 267/162
[51] Int. Cl. .............................................. F16f 1/26
[58] Field of Search ........................... 267/161, 162

[56] References Cited
UNITED STATES PATENTS
3,237,739  1/1966  Pritchard ........................... 267/161
1,614,002  1/1927  Horton .............................. 267/161
3,107,766  10/1963  Pritchard ........................... 267/161

Primary Examiner—James B. Marbert
Attorney—Lawrence J. Winter

[57] ABSTRACT

This invention relates to single or twin plate friction clutches in which the clutch spring is a Belleville spring and a number of levers are provided to release the clutch engaging load. The radially inner edge of the Belleville spring define a number of circumferentially spaced recesses so that the range of axial positions of the Belleville spring portion engaged with the pressure plate, over which an adequate axial load is applied by the spring, is greater than if that Belleville spring had a continuous circular edge. The specification describes forms of such recesses and suitable parts of the Belleville spring for engagement with the pressure plate. Conveniently the levers are clamped between the Belleville spring and the pressure plate.

4 Claims, 14 Drawing Figures

3,758,094

FRICTION CLUTCHES AND TO ENGAGING LOAD APPLYING SPRING MEANS FOR SUCH FRICTION CLUTCHES

TO ALL WHOM IT MAY CONCERN

BE IT KNOWN THAT WE, FREDERICK CRUTCHLEY and DAVID HINDLEY, both British subjects, of Tachbrook Road, Leamington Spa, Warwickshire, England, have invented certain new and useful "Improvements in or relating to friction clutches and to engaging load applying spring means for such friction clutches" of which the following is a Specification.

This invention relates to friction clutches of the kind including a clutch plate, a pressure plate, an engaging load applying spring comprising an annular component of spring material, the annular component being in engagement with fulcrum means so that one of the radially inner or outer peripheral edges of the annular component can be moved axially relative to the other to apply or release an axial load, and one or more operating levers, the clutch plate being arranged to be clamped between the pressure plate and a rotary member by the action of the engaging load applying spring on the pressure plate so that rotary drive can be transmitted from one to the other of the clutch plate and the rotary member, and the one or more operating levers being arranged to effect clutch disengagement by moving one of the peripheral edges to release the clamping load applied by the engaging load applying spring. The invention relates also to a spring suitable for use as an engaging load applying spring of a friction clutch of the kind described.

It will be understood that wear of the friction engaging surfaces of the clutch plate of a friction clutch of the kind described will have occurred after a number of operations. Such wear results in a reduction in the axial thickness of the clutch plate. Thus, when the friction clutch is engaged, the annular engaging load applying spring portion engaged with the pressure plate is nearer to the rotary member than it was before such wear occurred.

Adjustment means can be provided to enable a fulcrum support for the annular engaging load applying spring to be moved axially towards the clutch plate by a distance corresponding to the reduction in thickness of the clutch plate caused by wear. After such axial movement of the fulcrum support the clamping load applied to the pressure plate by the annular engaging load applying spring following wear of the clutch plate, is substantially the same as it was before such wear occurred. A worn clutch plate may be replaced by a fresh clutch plate so that the axial disposition of the annular engaging load applying spring relative to the remainder of the clutch before the occurance of such wear may be restored substantially.

A certain amount of wear of the clutch plate can be accommodated without the need to make use of adjustment means such as are described above, or without the need to replace the worn clutch plate with a fresh clutch plate, providing that the clamping load applied by the annular engaging load applying spring to clamp the clutch plate between the rotary member and the pressure plate is within an acceptable range. Furthermore it will be understood that the greater the amount of wear of the clutch plate which may be accommodated without the clamping load falling below an acceptable magnitude, the less frequent will be the need to operate the adjustment means or to replace the worn clutch plate by a fresh clutch plate.

It is an object of this invention to provide a spring comprising an annular component of spring material one of the radially inner or outer peripheral edges of which is movable axially relative to the other to apply or release an axial load, the spring being suitable for use as the engaging load applying spring of a friction clutch of the kind described and being capable of applying an adequate axial clamping load to a pressure plate of the friction clutch over a greater range of axial positions of that part of the spring which engages with the pressure plate than have such annular springs in which the radially inner peripheral edge is a continuous circular edge.

According to one aspect of this invention there is provided a spring suitable for use as an engaging load applying spring of a friction clutch of the kind described, the spring comprising an annular component of spring material, one of the radially inner or outer peripheral edges of the annular component being movable axially relative to the other to apply or release an axial load, wherein the spring has one or more radially outwardly extending recesses defined by its radially inner peripheral edge.

Preferably said radially inner peripheral edge defines a circumferential array of said recesses.

The radially inner peripheral edge may be scalloped. Alternatively, each juxtaposed pair of recesses may be spaced apart circumferentially by an arcuate portion of the annular component of spring material. Each circumferentially spaced recess may be arcuate or may comprise a radially extending slot and an aperture, the slot opening at its radially outer end into the aperture, the circumferential width of the aperture being greater than the width of the slot.

The spring may include locating means arranged to cooperate with a rotatable part of the friction clutch so as to oppose any tendency of said spring to rotate relative to rotating parts of the friction clutch during operation of the friction clutch. Conveniently the locating means comprise a circumferentially spaced pair of radially inwardly protruding portions defined by said radially inner peripheral edge, the protuberances cooperating together to provide a spaced pair of radially extending abutment surfaces arranged to receive therebetween a projection carried by a rotatable part of the friction clutch. Where each circumferentially spaced recess comprises a radially extending slot and an enlarged aperture, the space defined between the spaced pair of protuberances may comprise an extension of one of the radially extending slots and may be wider than the corresponding radially extending slot.

According to another aspect of this invention there is provided a friction clutch of the kind described wherein the engaging load applying spring comprises a spring according to said one aspect of this invention.

Said fulcrum means may engage the spring radially inwards of the radially outermost end of the or each recess, preferably at the midpoint of the radial extent of the or each recess. Alternatively said fulcrum means may engage the spring at the radially outermost end of the or each recess.

The clutch may be provided with adjustment means for moving the radially outer peripheral edge of the annular engaging load applying spring axially towards the pressure plate in order to compensate for wear of the clutch plate, the adjustment means comprising an annular part of the cover plate which is engaged threadably with the remaining part of the cover plate so that it moves axially relative to the remaining part when rotated about the axis of the clutch. The annular part may be provided with one or more recesses opening into its threaded periphery and defining a circumferentially-spaced pair of faces, the recesses being arranged to receive snugly part of a locking plate, the arrangement being such that, when a locking plate is received snugly in a said recess and is fastened to the other part of the cover plate, the annular part of the cover plate is locked against rotary movement relative to the other part of the cover plate, and thus against axial adjustment movement.

Where the annular engaging load applying spring of the friction clutch is provided with locating means arranged to oppose any tendency of the spring to rotate relative to rotating parts of the clutch during operation of the clutch, the locating means may cooperate with part of the or at least one of the operating levers. The or each lever may have an axially extending portion which cooperates with radially extending abutment surfaces of such locating means.

According to another aspect of this invention, there is provided a friction clutch of the kind described, wherein part of the or each operating lever is clamped between the annular engaging load applying spring and the pressure plate by the action of said spring.

Preferably there is a plurality of said operating levers, each of which is orientated radially relative to the clutch and which are arranged in a circumferential array. Conveniently each radially extending edge of each of the plurality of operating levers is in abutment with the nearer radially extending edge of the juxtaposed lever.

The pressure plate may carry one or more axially extending studs, the or each stud projecting through a corresponding aperture defined in a cover plate of the friction clutch and which has, or carries a member which affords a flange on the side of the aperture remote from the pressure plate, the flange affording a reaction surface for one end of a release spring which acts to urge the pressure plate towards the cover plate.

The part of the or each operating lever clamped between the annular engaging load applying spring and the pressure plate may be an intermediate part between the two radially spaced ends of the operating lever, in which case the radially inner end of the operating lever may be arranged to cooperate with a thrust release bearing so as to be movable axially away from the pressure plate by the thrust release bearing in order to release the clamping load applied by the annular engaging load applying spring to the pressure plate. Such axial movement of the radially inner end of a said operating lever away from the pressure plate may be against the action of a compression spring. One side of a cover plate of the friction clutch may be arranged to provide a reaction surface for such a compression spring which acts to urge the radially inner end of the or each operating lever towards the pressure plate and against one stop on a tubular member which extends through an aperture in the cover plate, there being a second compression spring which takes its reaction from the opposite side of the cover plate and acts upon the thrust release bearing to hold the thrust release bearing against a second stop on the tubular member, the second stop being at the opposite end of said tubular member from the first mentioned stop. Alternatively the part of the or each operating lever which is clamped between the pressure plate and the annular engaging load applying spring may comprise the radially outer end of the operating lever, in which case the or each operating lever may be attached to a cover plate of the clutch by attachment means including bolts or rivets which extend through an intermediate part of the or each operating lever between the ends thereof and afford a fulcrum support for the corresponding operating lever. In the latter arrangement the radially inner end of the or each operating lever may be arranged to cooperate with a clutch release bearing so as to be movable axially towards the pressure plate by the clutch release bearing in order to release the clamping load applied to the pressure plate by the annular engaging load applying spring.

Several embodiments of this invention will be described now by way of example only with reference to the accompanying drawings of which:

Figure 9:
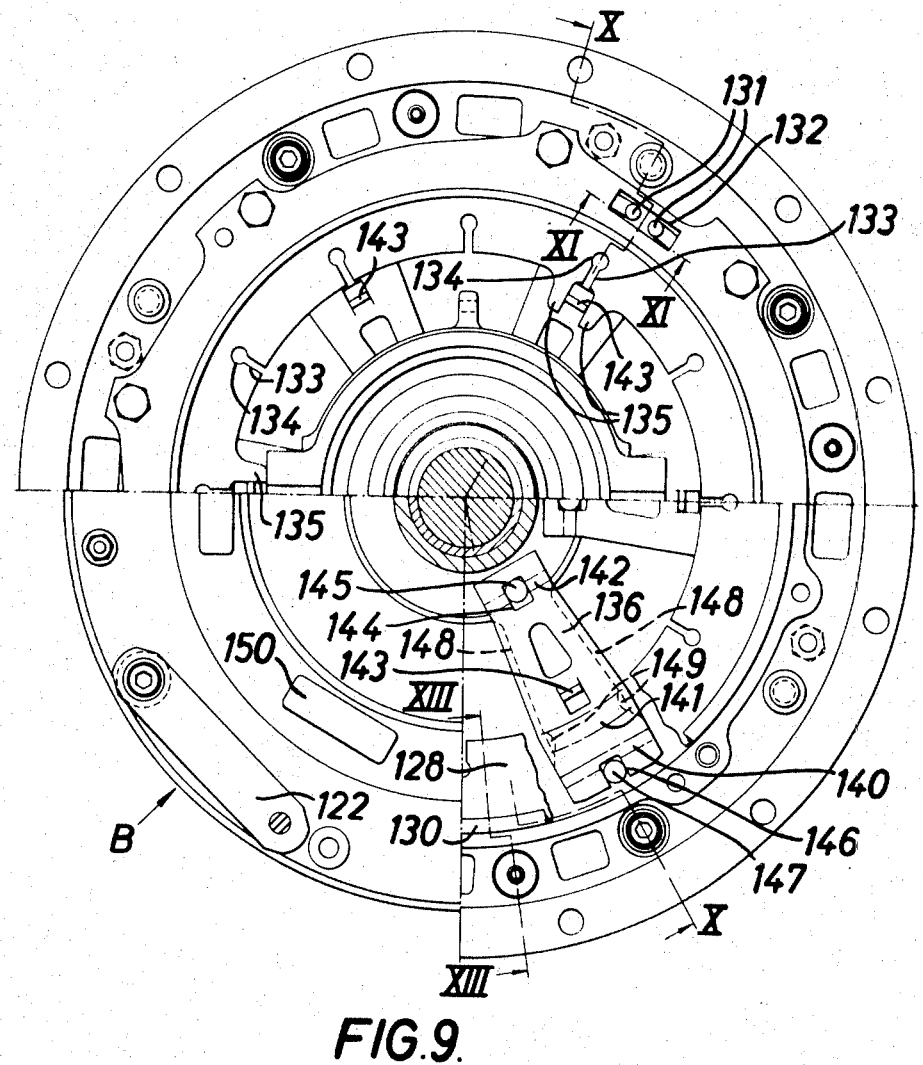
Figure 10:
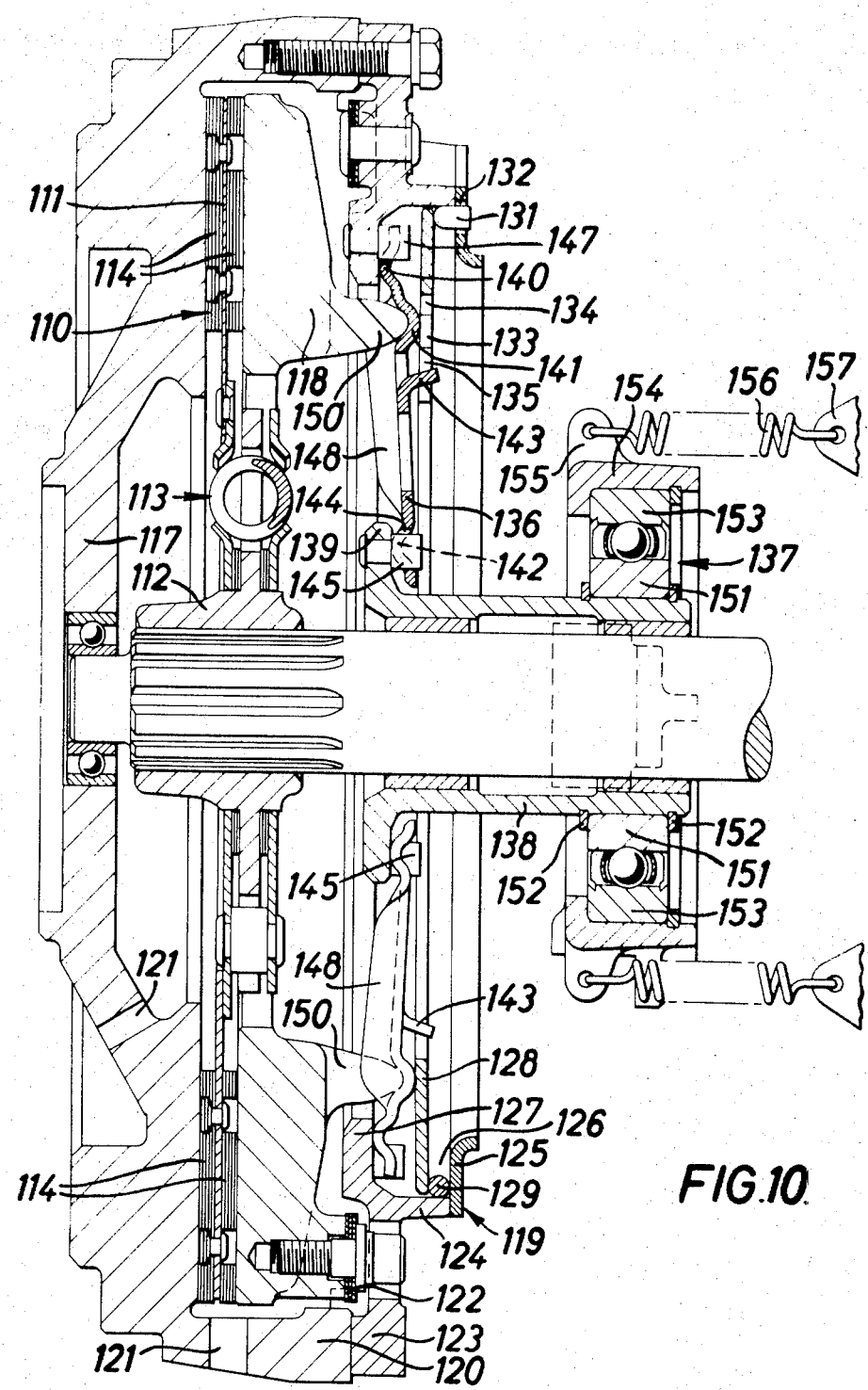
Figure 11:
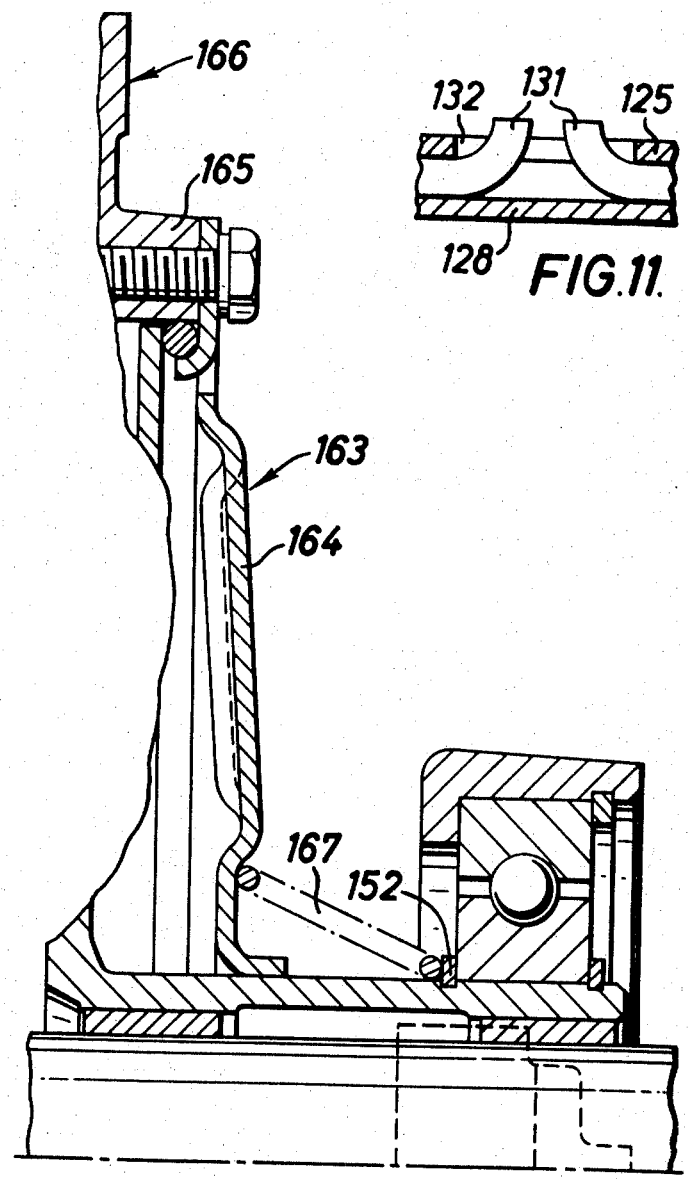
Figure 12:
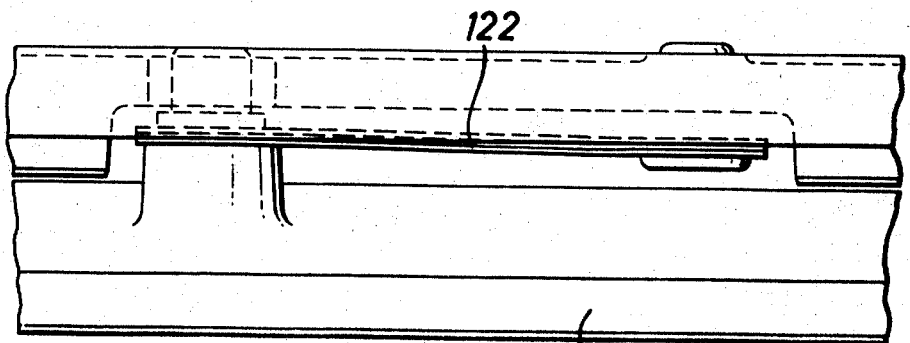
Figure 13:
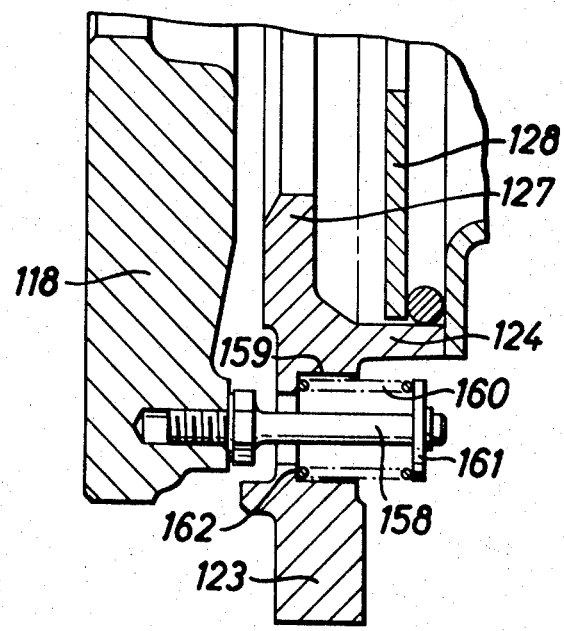

FIG. 9 is an axial view of another embodiment of a single plate friction clutch in accordance with the invention as seen when looking in the direction from the release bearing towards the flywheel, one sector of the Figure having the release bearing, part of the cover plate and a fragmentary portion of the engaging load applying spring removed, and another sector of the Figure having the release bearing, cover plate, engaging load applying spring and operating levers removed;

FIG. 10 is a sectional view on the line X—X of FIG. 9 to a larger scale than FIG. 9;

FIG. 11 is a detail of the friction clutch of FIGS. 9 and 10 as seen on the line XI—XI of FIG. 9 to a larger scale than FIG. 9;

FIG. 12 is a fragmentary view of the friction clutch of FIG. 9 seen in the direction of arrow B, to a larger scale than FIG. 9;

FIG. 13 is a sectional view of a detail of the friction clutch of FIGS. 9 and 10 on the line XIII—XIII of FIG. 9 to a larger scale than FIG. 9; and FIG. 14 is a sectional view of part of a modified form of cover plate and clutch release bearing for use in the friction clutch of FIGS. 9 to 13.

Referring to FIGS. 1 to 4 of the accompanying drawings, the multiplate friction clutch has two clutch plates 10 and 11 which are of conventional design and form no part of the present invention. The clutch plate 10 is arranged to be clamped between the flywheel 12 of an automobile engine and one radial face of an intermediate pressure plate 13. The clutch plate 11 is arranged to be clamped between the other radial face of the intermediate pressure plate 13 and a pressure plate 14. A cover plate assembly 15 is secured to circumferentially spaced axial projections 16 of a spacer ring by which the friction clutch is secured to the flywheel 12. The intermediate pressure plate 13 is connected to the projections 16 by a number of circumferentially spaced chordwise extending straps 17 of resilient material. The pressure plate 14 is connected to the projections 16 by a number of circumferentially spaced straps 18. Each strap 18 is clamped at one end between the cover plate assembly 15 and the corresponding projection 16.

The cover plate assembly 15 comprises a radially outer annular part 19, which is bolted to the projections 16, an adjustment ring member 20 which is in screw threaded engagement with the radially inner periphery of the annular part 19, and a dished annular plate 21 which is rivetted at 22 to the radially inner periphery of the adjustment ring member 20. A number of recesses 23 are defined in the adjustment ring member 20 so as to open into both the radially outer edge surface thereof and the radial face thereof remote from the pressure plates 13 and 14. Each recess 23 is spaced circumferentially from the other recesses 23. The circumferential dimension of each recess 23 is such that it can accommodate a radially orientated plate 24 snugly so as to lock the adjustment ring member 20 to the radially outer annular part 19 and restrain the adjustment ring member 20 against rotary movement about the axis of the clutch, the radially orientated plate 24 being bolted to the radially outer annular part 19. The radially inner surface of the adjustment ring member 20 includes a cylindrical surface and a frusto-conical surface which extends radially inwardly from the cylindrical surface and slopes away from the pressure plates 13 and 14. The cylindrical surface and the frusto-conical surface cooperate together to define a shoulder 25 in which is engaged the radially outer peripheral edge of an annular spring 26 of the type known as a "Belleville Spring."

A radially deformable spring clip 27 of the kind comprising an annular strip of spring material with two ends defining a radial gap, is spring into a radially inwardly opening circumferential groove 28 which is defined in the cylindrical surface of the ring member 20. The groove 28 is spaced axially from the shoulder 25 being nearer to the pressure plate 14 than is the shoulder 25.

Figure 1:
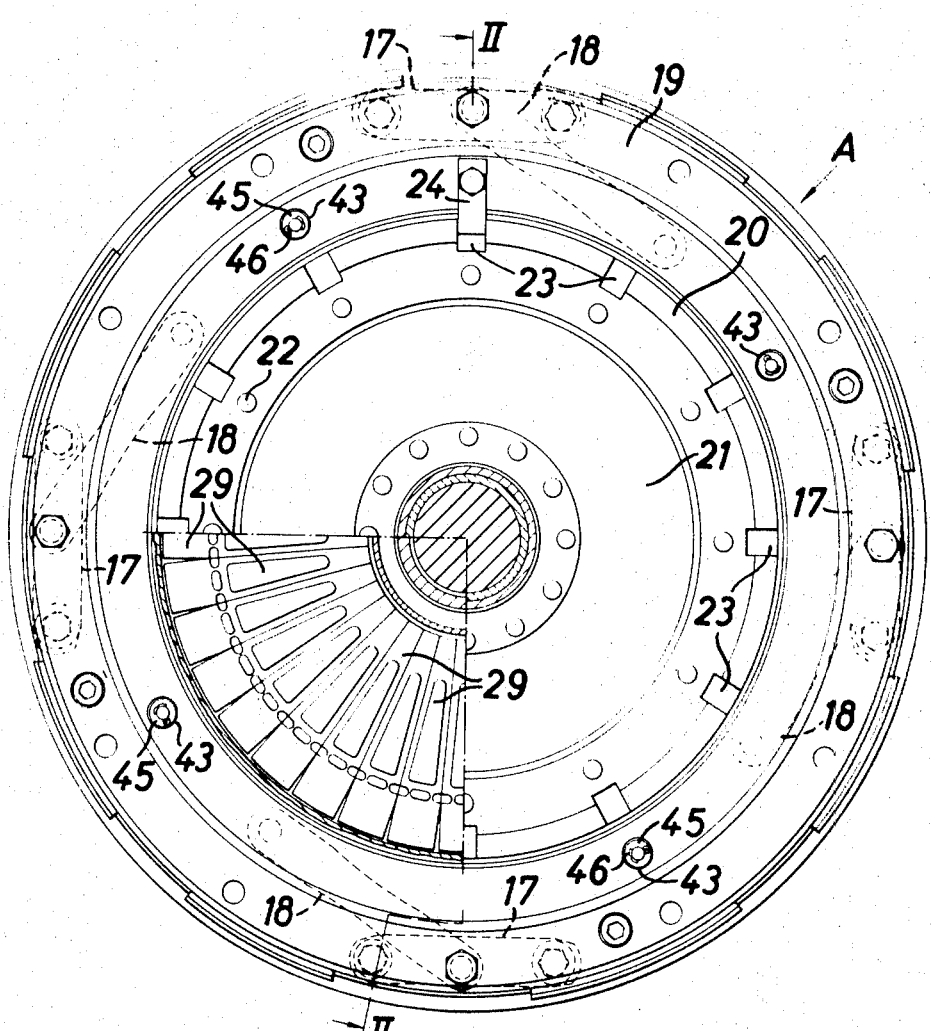
FIG. 1 is an axial view of one embodiment of a multi-plate friction clutch in accordance with this invention having part of its cover plate assembly removed to show the clutch operating levers.
Figure 2:
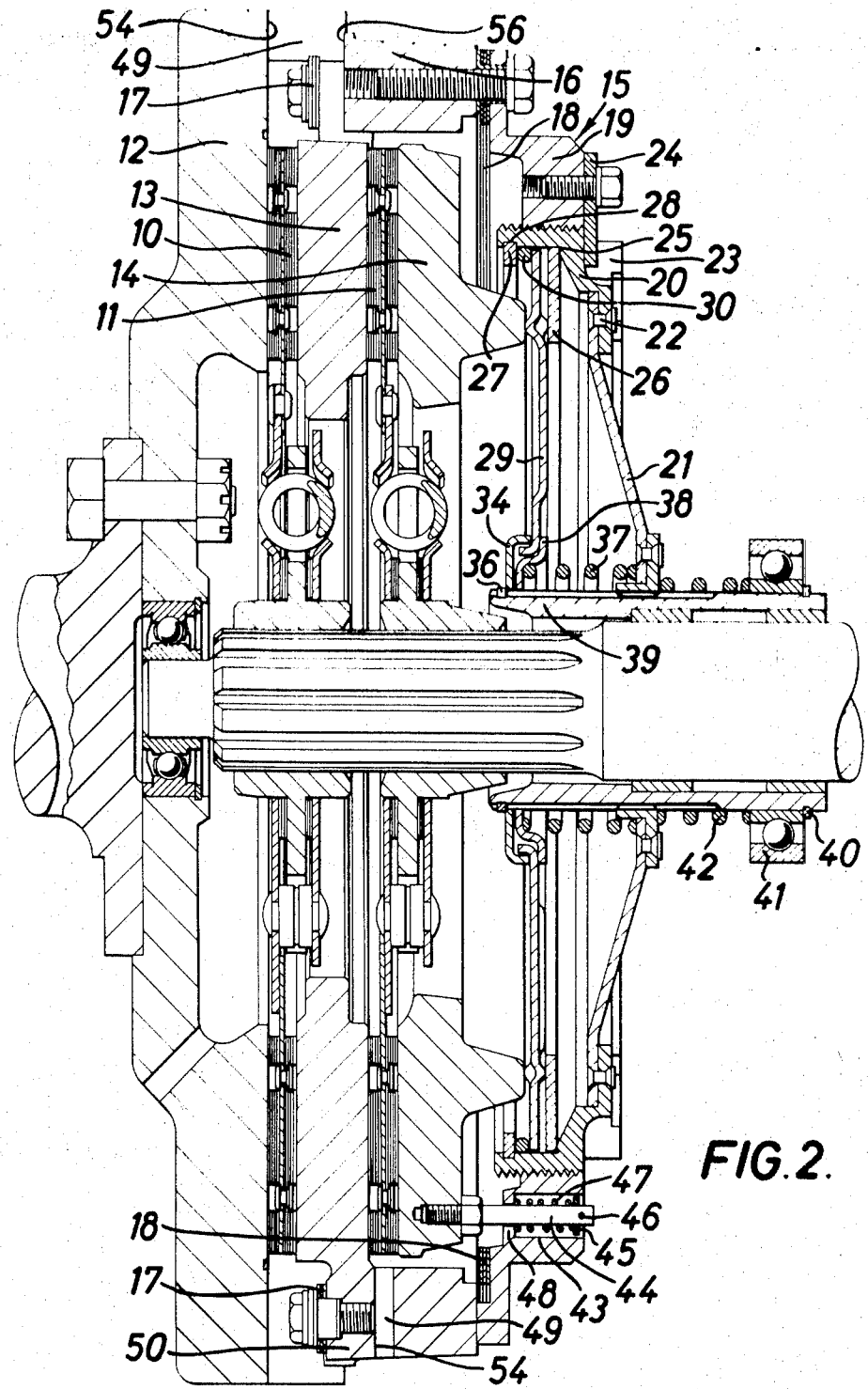
FIG. 2 is a section on the line II—II of FIG. 1 to a larger scale than FIG. 1.
Figure 3:
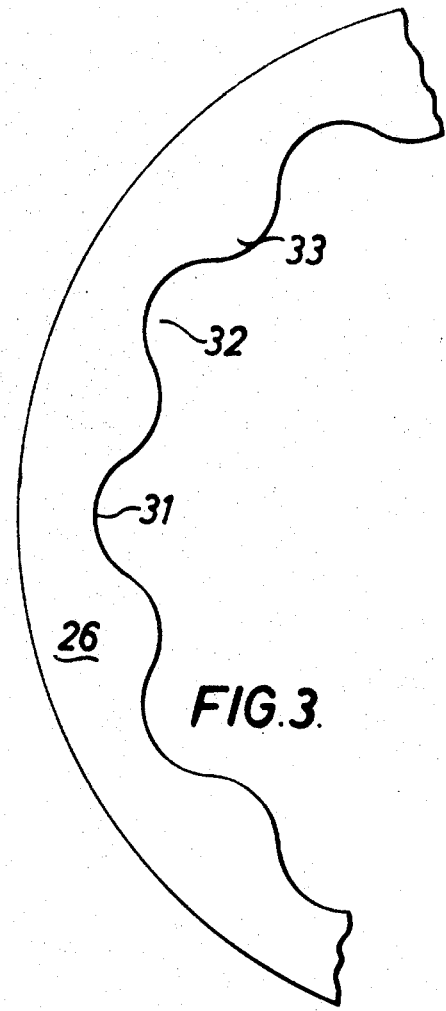
FIG. 3 is a fragment of a detail of the friction clutch of FIGS. 1 and 2 to a larger scale than FIG. 2.

A circumferential array of levers 29 extend radially between the pressure plate 14 and the spring 26. The radially outer peripheral edge of each lever 29 is spaced from the radial face of the spring clip 27 remote from the pressure plate 14 by a ring 30. Each lever 29 is joggled and swaged so that an intermediate projection engages the pressure plate 14 in the manner of a fulcrum and a similar projection projects in the opposite direction to engage the annular spring 26 near to the radially inner edge thereof similarly in the manner of a fulcrum. Each lever 29 abuts the two juxtaposed levers 29. FIG. 3 shows that the radially inner edge 31 of the annular spring 26 is scalloped, i.e., shaped so as to define a circumferential array of side by side curved recesses 32, the radially inner edge of each radial projection 33 separating a side by side pair of the curved recesses 32 being curved also. The radial extent of each curved recess 32 is such that the radially outermost part of each recess 32 is aligned axially with the cooperating axial projections of the levers 29. The radially inner end of each lever 29 is angled so as to define a portion projecting towards the pressure plates 13 and 14, the angled portion engaging with an annular plate 34 having a cylindrical radially outer peripheral flange extending away from the pressure plates 13 and 14. The radially inner end of the radial plate 34 is held against a stop 36 by the action of a compression spring 37 on a joggled plate 38, the radially inner part of the dished plate 21 affording a reaction surface for the spring 37. The stop 36 is mounted on the radially outer surface of a splined tubular member 39 which is movable axially relative to the cover plate assembly 15 and which has its splines in engagement with a splined radially inner periphery of the dished annular plate 21. A further stop 40 spaced axially from the stop 36 is located on the opposite side of the dished annular plate 21 from the stop 36. The radially inner sleeve of the thrust bearing ball race 41 is held in engagement with the stop 40 by means of a compression spring 42 taking its reaction surface from the radial surface of the dished annular member 21 remote from the pressure plates 13 and 14.

Four cylindrical apertures 43 are defined in the radially outer annular part 19 and are spaced apart circumferentially. Four studs 44 project axially from the pressure plate 14 each through a corresponding aperture 43. An annular disc 45 is force fitted onto the end of each stud 44 remote from the pressure plate 14 and retained by a split pin 46. A compression spring 47 acts at one end on the annular disc 45 and at the other end on a projection 48 projecting radially into the aperture 43, thus acting as a release spring urging the pressure plate 14 towards the cover plate assembly 15.

Figure 4:
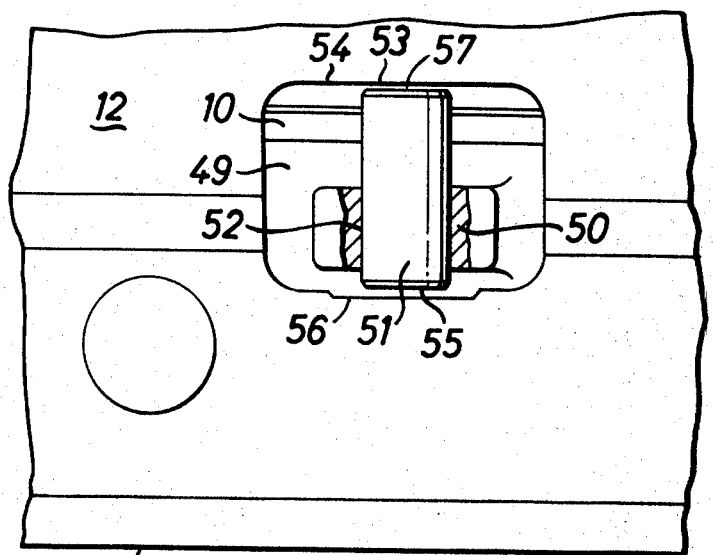
FIG. 4 is a view of part of the friction clutch of FIGS. 1 and 2 seen in the direction of the arrow A in FIG. 1 to a larger scale than FIG. 1.

A number of radial apertures 49 in the axial projections 16 constitute spaces into which project radially extending lugs 50 of the intermediate pressure plate 13. FIG. 4 illustrates automatic adjustment means for the intermediate pressure plate 13 wherein a cylindrical member 51 is an interference fit within an axial aperture 52 formed in a lug 50 of the intermediate pressure plate 13. The cylindrical member 51 is arranged so that one of its ends 53 abuts the end 54 of the aperture 49 further from the cover plate assembly 15 when the intermediate pressure plate 13 holds the clutch plate 10 clamped between itself and the flywheel 12 and so that its other end 55 abuts the end 56 of the aperture 49 nearer the cover plate assembly 15 when the intermediate pressure plate 13 is in a clutch disengaged position. FIG. 4 shows the position of the cylindrical member 51 within the aperture 49 at the instant when the pressure plate 13 is brought into abutment with the clutch plate 10 during a clutch engagement operation but prior to the axial compression of the clutch plate 10 which takes place before the final engaged position of the pressure plate 13 is reached. Thus normally a clearance 57 exists between the end 55 of the cylindrical member 51 and the end 54 of the aperture 49 in the condition illustrated in FIG. 4, the clearance 57 being taken up by the axial compression of the clutch plate 10.

In use of the multiplate friction clutch illustrated in FIGS. 1 to 4, normally the annular spring 26 acts on the pressure plate 14 through the levers 29 to apply the clamping pressure by which the clutch plate 11 is clamped between the two pressure plates 13 and 14 and the clutch plate 10 is clamped between the pressure plate 13 and the flywheel 12. Thus rotary motion imparted to the flywheel 12 by the automobile engine is transmitted to the clutch plates 10 and 11.

In order to disengage the clutch plates 10 and 11 from the flywheel 12, the clutch release mechanism is operated so that axial movement is imparted to the thrust release bearing 41 in the direction away from the flywheel 13. Such axial movement away from the flywheel 13 is transmitted to the radially inner ends of the levers 29 through the stop 40, the tubular member 39, the stop 36 and the annular plate 34, so that the levers 29 pivot at their radially outer ends about the fulcrum afforded by the ring 30. Such pivotal movement of the levers 29 deflects the radially inner end of the annular spring 26 axially away from the flywheel 12 and thus releases the clamping load applied to the pressure plate 14 by the spring 26 through the levers 29. Upon the release of the clamping load the pressure plate 14 moves axially away from the flywheel 12 under the action of the release springs 47 urging the pressure plate 14 towards the cover plate assembly 15. Such movement of the pressure plate 14 is followed by similar movement of the pressure plate 13 away from the flywheel 12 under the spring action of the straps 17 until such movement of the pressure plate 13 is arrested by abutment of the end 55 of the cylindrical member 51 with the end 56 of the aperture 49. It will be appreciated that the pressure plate 14 moves through a greater axial distance away from the flywheel 12 than does the pressure plate 13.

As the axial thickness of the clutch plate 10 reduces during use due to wear, the pressure plate 13 will adopt a position nearer to the flywheel 12 in the clutch engaged position, and, if the end 53 of the cylindrical member 51 abuts the end 54 of the aperture 49 before the pressure plate 13 reaches the fully engaged position, the clamping pressure applied to the pressure plate 13 by the annular spring 26 through the pressure plate 14 and the clutch plate 11 will overcome the interference between the cylindrical member 51 and the lug 50 so as to move the lug 50 relative to the cylindrical member 51 axially and thus increase the length of the portion of the cylindrical member 51 projecting from the side of the lug 50 remote from the clutch plate 10. Thus upon clutch disengagement, when the intermediate pressure plate 13 is brought to rest by the abutment of the end 55 of the cylindrical member 51 with the end 56 of the aperture 49, the position adopted by the pressure plate 13 will be further from the end 56 of the aperture 49 than it was before the wear of the clutch plate 10 occurred.

As the actual thickness of the two clutch plates 10 and 11 reduces during use of the clutch due to wear of the clutch plates, the position adopted by the radially inner periphery of the annular spring 26 and of the radially inner ends of the levers 29 in the clutch engaged condition moves nearer to the flywheel 12. It will be understood that the provision of the springs 37 and 42 permits such movement of the radially inner ends of the levers 29 to take place without loosening the support of the radially inner ends of the levers 29 which would lead to excessive rattling and collapse of the lever support structure. The axial relationship between the radially outer edges of the levers 29 and the annular spring 26 relative to the adjustment ring member 20 will remain substantially constant during such movement.

If the clutch plates 10 and 11 wear to such an extent that the clamping load applied by the annular spring 26 to clamp the clutch plate 10 between the flywheel 12 and the intermediate pressure plate 13 and to clamp the clutch plate 11 between the pressure plates 13 and 14 falls to an unacceptably low value, the location of the radially outer peripheral edge of the annular spring 26 relative to the flywheel 12 may be altered by adjustment of the adjustment ring member 20 relative to the radially outer annular part 19 of the cover plate assembly 15. Such adjustment is achieved first by releasing the radially orientated plate 24 from engagement in a recess 23 of the adjustment ring member 20 and then rotating the adjustment ring member 20 within the radially outer annular part 19 so as to move the adjustment ring member 20 axially towards the flywheel 12. When the adjustment ring member 20 has been rotated to an angular extent which brings another recess 23 into radial alignment with the position in which the radially orientated plate 24 is adapted to be secured to the radially outer annular part 19 and in which the shoulder 25 has been moved axially towards the flywheel 12 by an amount sufficient to realine the annular spring 26 and thus enable the annular spring 26 to exert an adequate clamping pressure to clamp the clutch plate 10 between the flywheel 12 and the intermediate pressure plate 13 and to clamp the clutch plate 11 between the intermediate pressure plate 13 and the pressure plate 14, the adjustment ring member 20 is locked against further rotary movement relative to the annular part 19 by the engagement of the plate 24 within said other recesse 23 and the securing of the plates 24 to the rotary outer annular part 19.

It has been found that an annular spring 26 having a scolloped radially inner edge as described can apply an adequate clamping load over a greater range of axial positions of its radially inner edge relative to its radially outer edge and thus for a greater amount of wear of the clutch plates 10 and 11, than is the case with a similarly dimensioned annular spring having a circular rotary inner edge.

Figure 5:
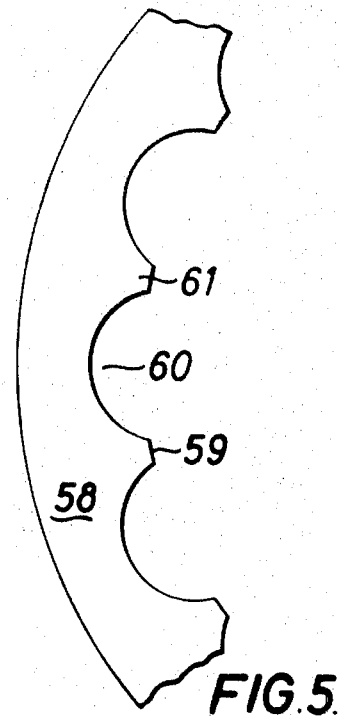
FIG. 5 is a fragment of a modified form of the detail of FIG. 3.

The arrangement by which one end of each lever 29 is clamped between the annular engaging load applying spring and the pressure plate, and the other end is held between the joggled plate 38 and the stop 36 by the action of the compression spring 37, enables the levers 29 to be located in position without the use of attachment means, such as bolts or rivets, and thus avoids the danger of clutch collapse arising because such attachment means became undone during operation of the clutch. FIG. 5 illustrates a Belleville spring 58 of a modified form which may be used in place of the Belleville spring 26. The radially inner peripheral edge 59 of the spring 58 defines a circumferential array of arcuate recesses 60, each juxtaposed pair of arcuate recesses 60 being spaced apart by an arcuate portion 61 of the spring 58.

Figure 7:
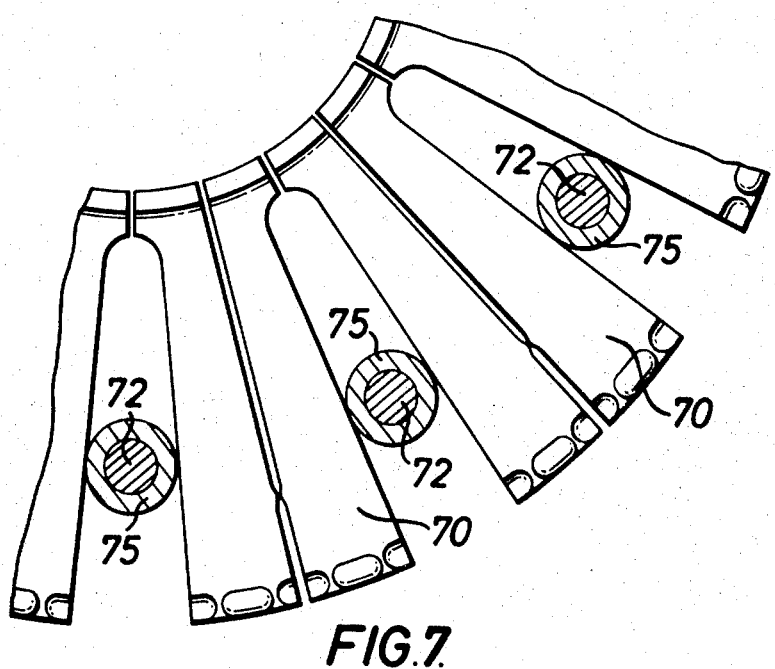
FIG. 7 illustrates an array of levers of the friction clutch of FIG. 6.
Figure 6:
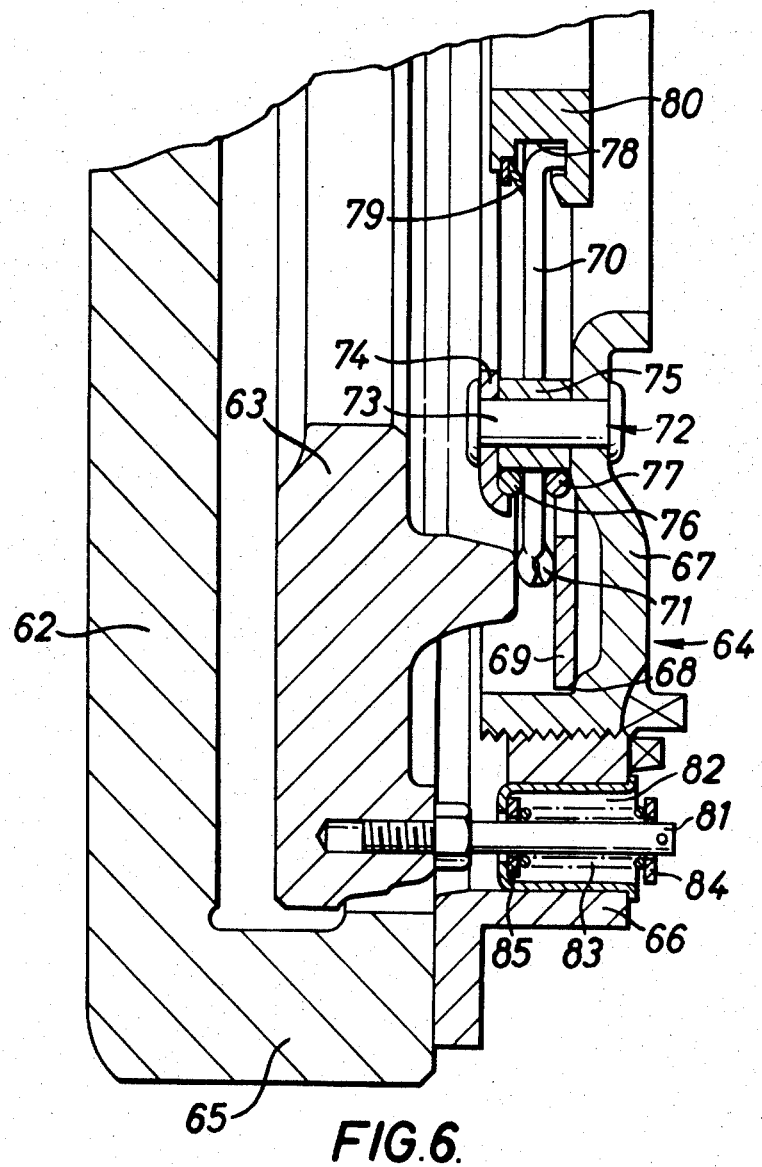
FIG. 6 is a fragmentary sectional view similar to FIG. 2 of a single plate friction clutch in accordance with this invention.

Referring to FIGS. 6 and 7, a friction clutch has a clutch plate (not shown) which is arranged to be clamped between a flywheel 62 and a pressure plate 63. A cover plate assembly 64 is secured to an axially projecting peripheral part 65 of the flywheel 62.

The cover plate assembly 64 comprises a radially outer annular part 66 and an adjustment ring member 67 which is in screw threaded engagement with the radially inner periphery of the radially outer annular part 66. The adjustment ring member 67 has an inner cylindrical surface which terminates at its end remote from the pressure plate 63 in a shoulder 68. The radially outer peripheral edge of an annular spring 69 of the type known as a "Belleville Spring" is engaged in the shoulder 68. The radially inner peripheral edge of the annular spring 69 defines radially outwardly extending recesses such as the recesses 32 of the spring 26, or the recesses 60 of the spring 58.

A circumferential array of levers 70 extend radially and have their radially outer ends 71 clamped between the spring 69 and the pressure plate 63. FIG. 7 shows that two side by side levers 70 are coupled together by attachment means 72. FIG. 6 shows that each attachment means 70 comprises a rivet 73 mounted on the adjustment ring member 67 so as to extend towards the pressure plate 63 between the two side by side levers 70, a radial ring 74 located on the other side of the levers 70 from the adjustment ring member 67, and a tubular spacer 75 extending between the radial ring 74 and the adjustment ring member 67 and surrounding the shank of the rivet 73. The heads of the rivets 73 extend on the remote radial faces of the radial ring 74 and the adjustment ring member 67. Two O-rings 76 and 77 are retained one between the lever 70 and the radial ring 74 and the other between the lever 70 and the adjustment ring member 67, the O-rings 76 and 77 being in contact with the surface of the tubular spacer 75 nearest the ends 71 of the levers 70.

The radially inner ends of the levers 70 are retained within a groove 78 by means of an annular spring 79, the groove 78 being formed in a member 80 which is movable axially with movement of the thrust release bearing (not shown).

The pressure plate 63 is provided with a stud 81 projecting axially through a corresponding aperture 82 formed in the radially outer annular part 66 of the cover plate assembly 64. A release spring 83 acts on a flange 84 carried by the stud 81 to urge the pressure plate 63 towards the cover plate assembly 64. A flange 85 projecting radially inwardly into the aperture 82 affords a reaction surface for the other end of the release spring 83.

The operation of the friction clutch illustrated in FIGS. 6 and 7 is similar to that of the friction clutch illustrated in FIGS. 1 to 4, the exception being that in order to disengage the clutch the thrust release bearing moves the member 80 towards the flywheel 62 so as to pivot the levers 70 about the attachment means 72 and thus deflect the radially inner part of the spring 69 away from the flywheel 62. It will be appreciated that such deflection of the spring 69 releases the clamping load applied to the pressure plate 63 to clamp the clutch plate between the pressure plate 63 and the flywheel 62, and that upon release of the clamping load the pressure plate 63 moves towards the cover plate assembly 64 under the influence of the release springs 83.

Figure 8:
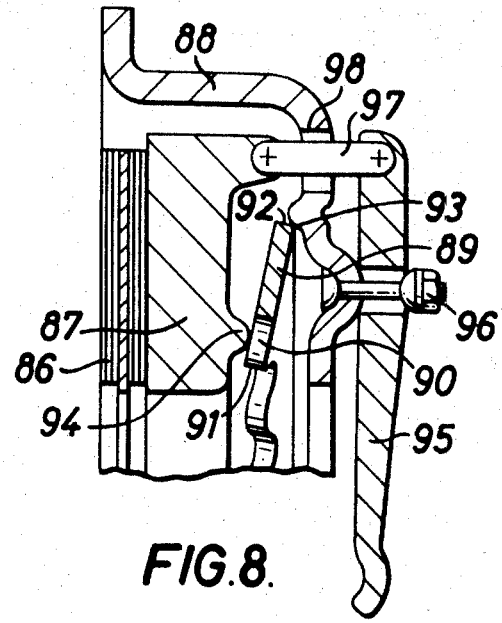
FIG. 8 is a fragmentary sectional view similar to FIGS. 2 and 6 of another embodiment of a single plate friction clutch in accordance with this invention.

Referring to FIG. 8, a friction clutch has a clutch plate 86, a pressure plate 87 and a cover plate 88. An annular spring 89 which is similar to the spring 26 or 58 and has a circumferential array of recesses 90 defined by its radially inner periphery 91, has its radially outer periphery 92 engaged in an annular shoulder 93 defined by the cover plate 88, and acts upon an annular projection 94 of the pressure plate 87 so as to apply the clutch engaging load by which the clutch plate 86 is clamped between the pressure plate 87 and a flywheel (not shown). The annular projection 94 affords the fulcrum for the annular spring 89 and engages the spring 89 substantially at the midpoint of the radial extent of the recesses 90.

An operating lever 95 is mounted pivotally on the cover plate by suitable attachment means 96 including a nut and bolt. The radially inner end of the lever 95 is arranged to cooperate with a clutch release bearing (not shown) and the radially outer end is pivotally connected to one end of a link 97. The link 97 passes through an aperture 98 in the cover plate and is pivotally connected at its other end to the pressure plate 86.

In order to release the clutch engaging load, the radially inner end of the lever 95 is moved towards the pressure plate 87 so that the pressure plate 87 is pulled towards the cover plate 88 by the lever 95 acting through the link 97.

Referring to FIGS. 9 to 13 of the drawings, the friction clutch has a clutch plate 110 comprising an annular friction facing carrier 111 mounted upon a splined annular part 112 by the usual torsional mounting arrangement shown generally at 113. The annular friction facing carrier 111 carries pads 114 of friction material. The friction material may be compressable, for example an asbestos-based material, or may be relatively incompressible, for example a ceramic material. It is to be understood that all the pads 114 will be formed of similar friction material, that is to say all of compressible friction material or all of relatively incompressible friction material.

The clutch plate 110 is arranged to be clamped between a flywheel 117 of an automobile engine and one radial face of a pressure plate 118. A cover plate assembly 119 is secured to an annular axially-projecting peripheral portion 120 of the flywheel 17, the annular portion 120 surrounding and being spaced radially from the radially outer periphery of the clutch plate 110, and the pressure plate 118. Cooling apertures 121 are formed in the annular portion 120 and in an intermediate portion of the flywheel 117 located radially between the pads 114 and the annular hub 112. The pressure plate 118 is connected to the cover plate assembly 119 by a number of circumferentially spaced chordwise extending straps 122 (see FIG. 12).

Referring to FIG. 10, the cover plate assembly comprises an annular main body 123 extending radially inwardly from the annular portion 120; an axially projecting annular rim 124 which is integral with the main bodh 123, has a diameter smaller than that of the annular portion 123 and larger than that of the inner periphery of the annular main body 123 and which extends axially away from the flywheel 117; and a ring 125 which is secured to the free end of the rim 124 so as to project radially inwardly therefrom. Thus a radially inwardly opening annular recess 126 is defined by the ring 125, the rim 124, and the radially inner portion 127 of the annular main body 123.

The clutch operating mechanism comprises an annular spring 128 of the type known as a "Belleville Spring" for applying the clutch engaging load, and a clutch release mechanism.

The annular spring 128 is housed within the annular recess 126 of the cover plate assembly 119. The radially outer portion of the surface of the annular spring 128 remote from the clutch plate 110 and the pressure plate 118 is held in abutment with a pivot ring 129 located within the corner of the annular recess 126 defined by the rim 124 and the ring 125. The pivot ring 129 comprises a bent rod of circular cross section. The rod is bent to define an open loop 130, with the end portions 131 of the rod extending at right angles to the plane of the open loop 130 through an aperture 132 defined in the ring 125, as is shown in FIGS. 9, 10 and 11.

Twelve radially extending slots are formed in the annular component of the spring 128. The slots are equispaced substantially and, although not all the slots are shown in FIG. 9, the position of those not shown can be understood from the drawing. Each slot comprises a slot portion 133 which terminates at its radially outer end in an enlarged aperture 134 formd in the annular spring 128. The radially inner ends of nine of the slot portions 133 open into the radially inner peripheral edge of the annular spring 128. Each of the other three slots is extended radially inwardly by a corresponding pair of radially inwardly projecting protuberances 135 formed integrally with the spring 128. The three inwardly extended slots are equi-spaced substantially and two of them are shown in FIG. 9, that part of the annular spring 128 including the third inwardly extended slot being broken away for the purpose of illustrating other part of the clutch operating mechanism to be described hereafter. The width of each slot extension defined by the protuberances 135 is greater than the width of the corresponding slot portion 133. Each of the enlarged apertures 134 is circular and the radii of the three circular apertures 134 are substantially equal. The centres of the enlarged apertures are spaced equally from the centre of the clutch, and are positioned within the annular spring 128 so that the radially outermost part of the periphery of each aperture 134 is further from the radially outer edge of the annular spring 128 than from the radially inner edge into which a noninwardly extended slot opens. The radial extent of the radial inward slot extension defined by a pair of protuberances 135 is substantially equal to the combined radial extent of the corresponding slot portion 133 and aperture 134.

The clutch release mechanism includes six radially extending levers 136 and a release bearing 137 supported on a tubular carrier member 138. The carrier member 138 is arranged to be mounted upon the driven output shaft for axial movement relative thereto, and has an annular flange 139 at its end nearer to the clutch plate 110.

Three of the levers 136 are aligned axially each with a corresponding one of the radially inwardly extended slots and each lever 136 is joggled and swaged so as to define three radially spaced convexly curved arcuate surfaces 140, 141 and 142. The radially outermost arcuate surfaces 140 are in engagement with the radial face remote from the clutch plate 110 of the radially inner portion 127 of the annular main body 123. The radially innermost arcuate surfaces 142 are in engagement with the radial face remote from the clutch plate 110 of the annular flange 139. The intermediate arcuate surfaces 141, which are curved in the opposite axial sense to the other arcuate surfaces 140 and 142 are in engagement with the annular spring 128. Thus it will be understood that each lever 136 lies between the annular spring 128 and the two radial faces with which the arcuate surfaces 140 and 142 are in engagement. The arcuate surfaces 141 engage the spring 128 approximately midway between the radially outermost edge of the enlarged apertures 134 and the radially inner end of the slot portions 133. A tab 143 projects axially from each lever 136 away from the clutch plate 110. The tab 143 of each of the three levers 136 aligned axially with the inwardly extended slots extends into the space defined between the corresponding pair of protuberances 135. The width of the tab 143 is such that it engages the two spaced radially extending abutment surfaces defined by the pair of protuberances 135. The rotation of the annular spring 128 relative to the levers 136 is prevented.

An aperture 144 is formed at the centre of the portion of each lever 136 defining the radially innermost arcuate surface 142. Each of six axially projecting pins 145 carried by the flange 139 projects through the corresponding aperture 144. A slot 146 extends radially inwardly from the centre of the radially outermost edge of each lever 136. Each of six pins 147 carried by the radially inner portion 127 of the annular main body 123 projects axially into engagement with the corresponding slot 146. Thus the tubular carrier member 138 and the levers 136 rotate with the cover plate assembly 119 and the flywheel 117.

The radially extending edge portions of each lever 136 between the two arcuate surfaces 140 and 142 have axially extending flanges 148 which project towards the pressure plate 118. Those portions 149 of the flanges 148 in the region of the intermediate arcuate surface 141 converge axially towards that arcuate surface 141 so as to cooperate with the arcuate surface 141 to define a concave recess within which the end of an axially extending pillar 150 of the pressure plate 118 is engaged closely. It will be understood that the material defining the arcuate surface 141 lies between the annular spring 128 and the end of the corresponding pillar 150.

The inner race 151 of the release bearing 137 is held between an axially spaced pair of circlips 152 mounted upon the outer surface of the tubular carrier member 138. The radially outer race 153 of the release bearing 137 carries an attachment 154 which defines a radially projecting lug 155. An axially extending tension spring 156 extends axially away from the clutch plate 110 and is engaged at one end within the lug 155 and at its other end within a lug 157 defined by linkage connected to a driver operable pedal of the motor vehicle.

FIG. 13 shows that the pressure plate 118 is provided with an axially extending pin 158 which projects through an aperture 159 defined in the radially outer part of the annular main body 123. A compression spring 160 acts between a flange 164 carried at the free end of the pin 150 and an annular surface defined by a shoulder 162 formed in the aperture 159. The arrangement shown in FIG. 13 is repeated at one or more circumferentially spaced points around the periphery of the friction clutch.

In use of the friction clutch illustrated in FIGS. 9 to 13, normally the annular spring 128 acts on the pressure plate 118 through the levers 136 and cooperating pillars 150 to apply the clamping pressure by which the clutch plate 110 is clamped between the pressure plate 118 and the flywheel 117. Thus rotary motion imparted to the flywheel 117 by the automobile engine is transmitted to the clutch plate 110.

In order to disengage the clutch plate 110 from the flywheel 117, the clutch release mechanism is operated so that the lug 157 is moved axially away from the clutch plate 110. Initially the tension spring 156 extends, thus increasing the axial load acting through the lug 156 and the release bearing 137 to move the tubular carrier member 138 axially away from the clutch plate 110. Once the axial load exerted by the tension spring 156 upon the lug 157 exceeds the axial load applied in the opposite direction by the annular spring 128 acting through the levers 136 upon the tubular carrier member 138, the tubular carrier member 138 moves axially away from the clutch plate 110. Thus the levers 136 pivot at teeir radially outer arcuate surfaces 140 and deflect the radially inner end of the annular spring 128 axially away from the pressure plate 118 and thus releases the clamping load applied to the pressure plate 118 by the spring 128 through the levers 136. Once the clamping load is released, the pressure plate 118 moves axially away from the flywheel 117 under the action of the compression springs 160 acting to urge the pressure plate 118 towards the cover plate assembly 119.

Referring to FIG. 14 there is illustrated a modified form of cover plate assembly 163 and clutch release mechanism for use in the friction clutch of FIGS. 9 to 13. The modified cover plate assembly 163 has an annular plate 164 bolted at its radially outer perimeter to an axially extending rim 165 of an annular main body 166, the annular main body 166 being similar to the annular main body 123 of the friction clutch of FIGS. 9 to 13. It will be understood that the annular plate 164 replaces the ring 125 of the cover plate assembly 119 of FIGS. 9 to 13. A conical compression spring 167 acts between the annular plate 164 and the circlip 152 wich is nearer the clutch plate 110. The conical spring 167 acts in opposition to the annular spring 128 and thus reduces the magnitude of the load which must be exerted at the driver operable pedal in order to disengage the clutch.

The provision of the radially extending slots opening at one end into the radially inner periphery of the annular spring 128 and terminating at the other end in the enlarged apertures 134 results in the compressive hoop stresses present in the annular spring 128 during operation of the clutch being less than would be the case if a corresponding annular spring having no such slots or recesses were employed. We have found that by reducing the magnitude of compressive hoop stresses present within an annular clutch engaging load applying spring during operation of the clutch, the range of axial positions of the radially inner edge of the annular spring relative to the radially outer edge within which the spring can apply an adequate clamping load is increased so that a greater amount of wear of the clutch plate 110 can be accommodated without the necessity of replacing the clutch plate 110 by a new clutch plate. We have found also that, where recesses are formed in the radially inner peripheral edge of an annular spring, the position relative to the radial extent of the recesses so formed of the fulcrum afforded by the engaging parts of the operating levers is influential upon the range of axial positions of the radially inner edge relative to the radially outer edge of the annular spring within which an adequate clamping load can be applied. We have found that an adequate clamping load can be applied over the greatest range of axial positions when the fulcrum afforded by the operating levers engages with the annular spring in the region of the midpoint of the radial extent of the recesses formed in the radially inner periphery of the spring.

We claim:

1. In a spring, including a conical shaped annular component of spring material with radial inner and outer peripheral edges with one of said edges being movable axially with respect to the other for applying or releasing an axial load on a friction clutch in which the spring is actuated by a separate lever, wherein the improvement comprises the radial inner peripheral edge has a plurality of circumferentially spaced arcuate recesses.

2. The spring of claim 1, wherein said radial inner peripheral edge is scalloped.

3. The spring of claim 2, wherein juxtaposed pair of recesses are spaced apart circumferentially by an arcuate portion of the annular component of spring material.

4. The spring of claim 3, wherein each recess comprises a radially extending slot and an aperture, the slot opening at its radially outer end into the aperture, the circumferential width of the aperture being greater than the width of the slot.

* * * * *